(12) United States Patent
Rekimoto

(10) Patent No.: US 6,980,199 B2
(45) Date of Patent: Dec. 27, 2005

(54) INFORMATION INPUT APPARATUS, AND INFORMATION PROCESSING APPARATUS, METHOD, RECORDING MEDIUM, AND PROGRAM

(75) Inventor: Junichi Rekimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 408 days.

(21) Appl. No.: 10/353,592

(22) Filed: Jan. 29, 2003

(65) Prior Publication Data

US 2003/0169231 A1 Sep. 11, 2003

(30) Foreign Application Priority Data

Jan. 31, 2002 (JP) .............................. 2002-023700

(51) Int. Cl.[7] .............................................. G09G 5/00
(52) U.S. Cl. ..................................... 345/169; 345/169
(58) Field of Search ............................... 345/156, 168, 345/169, 174, 175

(56) References Cited

U.S. PATENT DOCUMENTS

| | | | | |
|---|---|---|---|---|
| 3,503,296 A | * | 3/1970 | Bradford et al. | 84/478 |
| 5,311,175 A | * | 5/1994 | Waldman | 341/34 |
| 5,586,042 A | * | 12/1996 | Pisau et al. | 702/65 |
| 5,635,958 A | * | 6/1997 | Murai et al. | 345/168 |
| 6,396,477 B1 | * | 5/2002 | Hinckley et al. | 345/163 |
| 6,456,275 B1 | * | 9/2002 | Hinckley et al. | 345/156 |
| 6,697,054 B1 | * | 2/2004 | Kamizono | 345/168 |

* cited by examiner

*Primary Examiner*—Ricardo Osorio
(74) *Attorney, Agent, or Firm*—Frommer Lawrence & Haug LLP; William S. Frommer

(57) ABSTRACT

An information processing apparatus comprises a key and a proximity sensor. When the user places a finger on a depressing portion of the key, the proximity sensor detects the event, and inputs, to the information processing apparatus, proximity information indicating that the user's finger is in proximity to the key. Based on the proximity information which has been input, the information processing apparatus displays information relating to the function assigned to the key. When the depressing portion is depressed with the user's finger, the key inputs, to the information processing apparatus, information indicating that its contacts are in an on-state. Based on the input information, the information processing apparatus is able to execute the function. Thus, a function assigned to a physical key may easily be recognized by a user.

11 Claims, 13 Drawing Sheets

FIG.12
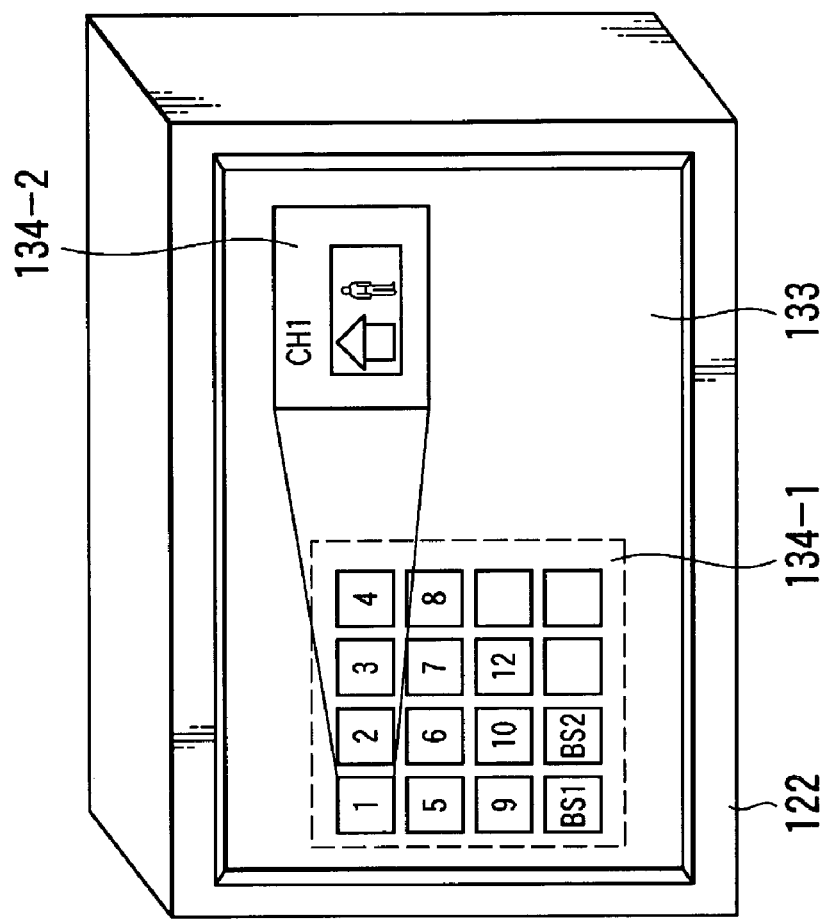
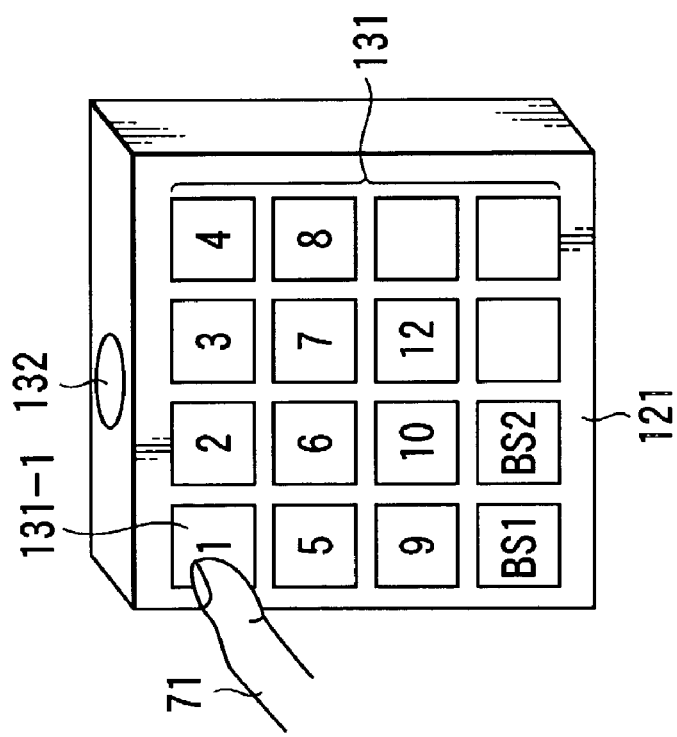

INFORMATION INPUT APPARATUS, AND INFORMATION PROCESSING APPARATUS, METHOD, RECORDING MEDIUM, AND PROGRAM

CROSS REFERENCE TO RELATED APPLICATIONS

The present document claims priority to Japanese Priority Document JP 2002-023700, filed in the Japanese Patent Office on Jan. 31, 2002, the entire contents of which are incorporated herein by reference to the extent permitted by law.

BACKGROUND OF THE INVENTION

1. Field of the Invention

The present invention relates to an information input apparatus, to an apparatus, a method, a recording medium and a program for processing information, and in particular to an information input apparatus, and to an apparatus, a method, a recording medium and a program for processing information, where a function assigned to a physical key or button is made readily recognizable by a user.

2. Description of the Related Art

When a user inputs information to an information processing apparatus, the user often operates keys, buttons, a keypad or the like (keys as hardware inclusive of buttons, keypads and the like are hereinafter referred to as keys for simplicity).

For example, when the user inputs information to a personal computer (PC), the user sometimes operates a keyboard having a plurality of keys. In a case where not only a phone number but a variety of information are input to a cellular phone, the user operates numeric keys and operation keys to which a plurality of functions are assigned.

In performing such operations, the user visually identifies a symbol or a character printed on the surface of a key and infers or guesses therefrom a function assigned to that key.

SUMMARY OF THE INVENTION

However, it is difficult for the user to visually identify the symbols printed on the surface of the keys in the following cases (1) to (5), thereby making it difficult to infer the function assigned to each key.

(1) When it is dark (for example, in a case where the user operates keys on a cellular phone at night or where the user operates keys on a remote controller for a television (TV) receiver in a darkened room)

(2) When a plurality of functions are assigned to a key and a plurality of symbols corresponding to the functions are printed on the surface of the key (for example, in a case where the function corresponding to the key varies depending on the mode an apparatus is in).

(3) When a key is disposed at a position which cannot be viewed by the user (for example, such as in a case where the key is disposed on the back of a device)

(4) When the user's finger is placed on the key.

(5) When a symbol appropriately expressing the function assigned to a key is not printed on the surface of the key (for example, in case a where a symbol which is hard for the user to visually identify is printed on the surface of the key).

The present invention is made in view of such problems, and makes functions assigned to keys readily recognizable to a user.

An embodiment of an information input apparatus according to the present invention may comprise a first input means for detecting an input based on physical contact by a live body and a second input means for detecting an input based on a nearing or the proximity of the live body to the first input means.

In such an information input apparatus according to the present invention, the input based on physical contact by the live body is detected by the first input means, while the input based on the nearing or the proximity of the live body to the first input means is also detected.

An embodiment of an information processing apparatus according to the present invention may comprise a first input means for detecting an input based on physical contact by a live body, a second input means for detecting an input based on a nearing or the proximity of the live body to the first input means, and a state identifying means for identifying a first state, where the live body is in proximity to the first input means, when the input based on the nearing or the proximity of the live body to the first input means is detected by the second input means, and for identifying a second state, where the live body has operated the first input means, when the input based on physical contact by the live body is detected by the first input means.

The information processing apparatus may further comprise a display control means for controlling in such a way that information relating to the first input means is displayed when the first state is identified by the state identifying means.

Information relating to the first input means is information relating to a function assigned to the first input means, and the information processing apparatus may further comprise a function executing means for executing the function assigned to the first input means when the second state is identified by the state identifying means.

The second input means may comprise a plurality of line-shaped transmission electrodes, an oscillator for providing an alternating current for transmission to each of the plurality of transmission electrodes, a plurality of line-shaped reception electrodes disposed so as not to be in contact with the plurality of transmission electrodes, a receiver for receiving the alternating currents flowing through the plurality of reception electrodes, and a circuitry equivalent to having a capacitor disposed at each cross point between the transmission electrodes and the reception electrodes.

The first input means may be a jog dial for detecting the input based on physical contact by the live body when the live body performs an operation of depression or rotation.

The first input means may be keys as hardware having contacts and may detect the input based on physical contact by the live body as an on-state or an off-state of the contacts.

The keys may be disposed above the cross points between the transmission electrodes and the reception electrodes.

A plurality of keys may be provided, and based on the detection by the second input means, the state identifying means may further identify a third state where the live body is disposed in an area between a first key and a second key.

The information processing apparatus may further comprise a function assigning means for assigning a function corresponding to the third state. The function executing means may execute the function corresponding to the third state and assigned by the function assigning means when the third state is identified by the state identifying means.

Based on the detection by the second input means, the state identifying means may further identify a fourth state where the live body moves over a plurality of keys in a predetermined direction. The function assigning means may further assign a function corresponding to the fourth state, and the function executing means may further execute the function corresponding to the fourth state and assigned by the function assigning means, when the fourth state is identified by the state identifying means.

The function assigning means may further assign a new function distinct from the functions which are already assigned to the keys.

The first input means may be part of a keyboard. The function assigning means may further assign a function corresponding to a left-click of a mouse to a certain key of the keys of the keyboard, assign a function corresponding to a right-click of the mouse to a certain key of the keyboard other than that to which the function corresponding to a left-click of the mouse is assigned, and assign a function corresponding to the moving of a cursor by the mouse as the function corresponding to the fourth state. The function executing means may make the keyboard function as the mouse when it is determined that a predetermined condition is satisfied, and based on the identification result of the state identifying means, may further execute each function corresponding to the left-click, the right-click, and the cursor movement of the mouse and assigned by the function assigning means.

An embodiment of a method of information processing according to the present invention comprises identifying a first state where a live body is in proximity to a first input means when an input based on a nearing or the proximity of the live body to the first input means is detected by the second input means, and identifying a second state where the live body has operated the first input means when an input based on physical contact by the live body is detected by the first input means.

An embodiment of a program for a recording medium according to the present invention comprises identifying a state, wherein a first state, where a live body is in proximity to a first input means, is identified when an input based on the nearing or the proximity of the live body to the first input means is detected by the second input means, and a second state, where the live body has operated the first input means, is identified when the input based on physical contact by the live body is detected by the first input means.

A program according to the present invention comprises causing the information processing apparatus to identify a state, wherein a first state, where a live body is in proximity to a first input means, is identified when an input based on a nearing or the proximity of the live body to the first input means is detected by the second input means, and a second state, where the live body has operated the first input means, is identified when an input based on physical contact by the live body is detected by the first input means.

According to the embodiments of the apparatus, the method, the recording medium, and the program for processing information of the present invention, when the input based on the nearing or the proximity of the live body to the first input means is detected by the second input means, the first state where the live body is nearing or in proximity to the first input means is identified. When the input based on physical contact by the live body is detected by the first input means, the second state where the live body has operated the first input means is identified.

According to the present invention, a function assigned to a physical key may be made readily recognizable to a user.

BRIEF DESCRIPTION OF THE DRAWINGS

The invention disclosed herein will become better understood as a detailed description is made of the preferred embodiments with reference to the appended drawings in which:

FIG. 12 is a view showing an example of an external construction of a remote controller as a third embodiment of the information processing apparatus of FIG. 5 and a TV receiver;

DETAILED DESCRIPTION OF THE PREFERRED EMBODIMENTS

<Information Input Apparatus>

Figure 1:
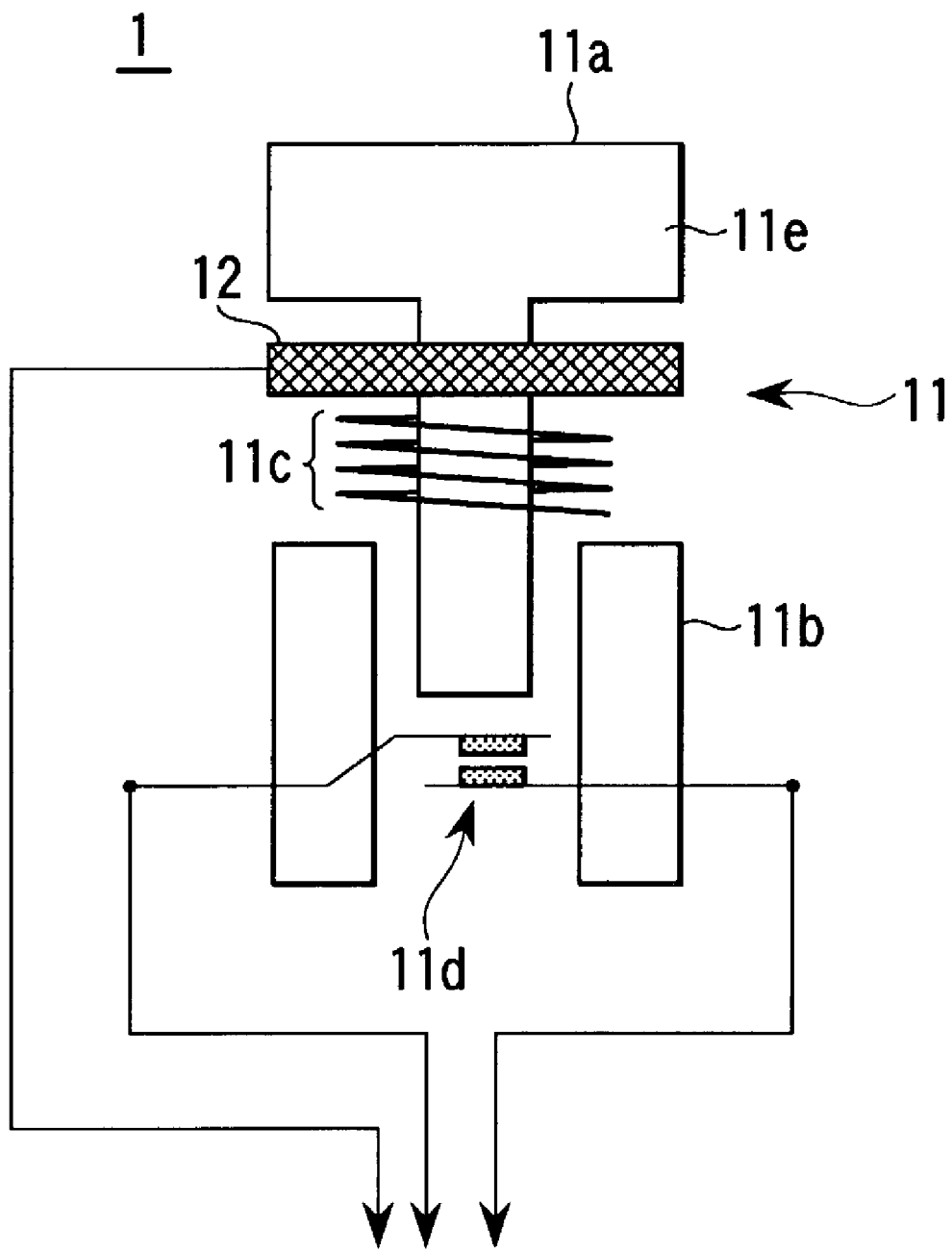
FIG. 1 is a sectional view showing an example of a construction of an information input apparatus to which the present invention is applied.

FIG. 1 is a sectional view illustrating an example of a construction of an information input apparatus 1 to which the present invention is applied.

Figure 2:
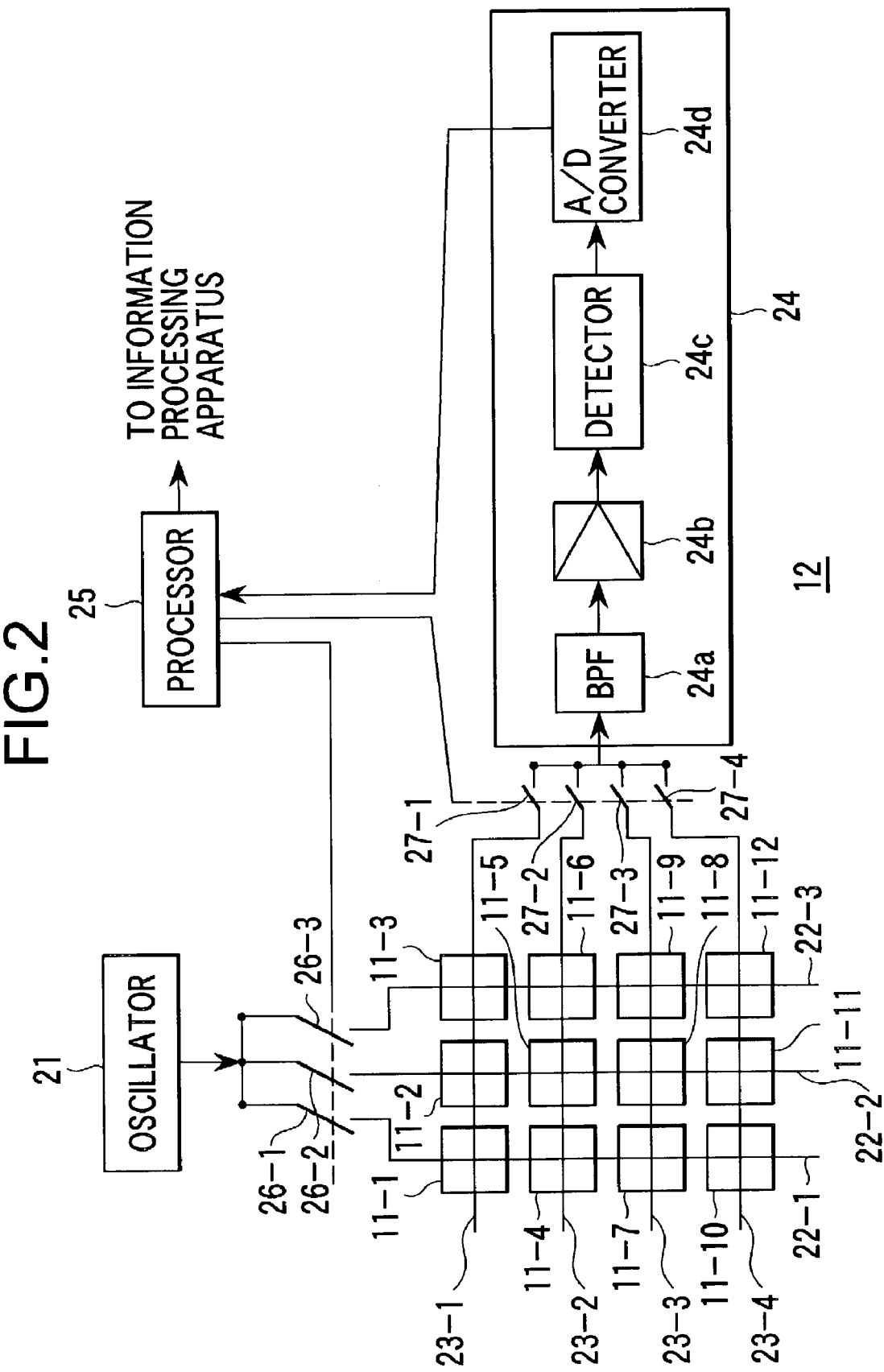
FIG. 2 is a block diagram showing an example of a construction of the proximity sensor of FIG. 1.

The information input apparatus 1 comprises a key (or keys) 11 and a proximity sensor 12, or more precisely, an element of the proximity sensor 12. The entire structure of the proximity sensor 12 is illustrated in FIG. 2.

The key 11 is provided with a depressing portion 11a, which is to be depressed (operated) by a live body (a user's finger, for example), in a case 11b so as to be slidable upward or downward in FIG. 1. A spring 11c is provided between the depressing portion 11a and the case 11b. Contacts 11d are also provided in the case 11b below the depressing portion 11a.

When the user's finger or the like is not contact with the depressing portion 11a (when the key 11 is in an initial state), as shown in FIG. 1, the depressing portion 11a is biased upward with respect to the figure by a spring 11c, and its lower end is located apart from the contacts 11d. In other words, the contacts 11d are in an off-state.

When the user depresses the depressing portion 11a against the biasing force of the spring 11c with a finger, the contacts 11d enter an on-state. Subsequently, when the user releases the finger from the depressing portion 11a, the depressing portion 11a is pushed up by a restoring force of the spring 11c and returns to its original position (back in the initial state) where the contacts 11d are in the off-state.

Thus, the key 11 provides manual input by the user to an information processing apparatus as information which represents the on-state of the contacts 11d. In other words, the key 11 detects an input based on physical contact by the live body (an operation by the user of depressing the depressing portion 11a with a finger, for example) as the on-state of the contacts 11d.

In this example, the key 11 is constructed in such a way that when the depressing portion 11a of the key 11 is depressed, the contacts 11d enter the on-state, and when the depressing portion 11a is returned to its original position (the initial state), the contacts 11d enter the off-state. However, the relationship between the position of the depressing portion 11a and the on or off-state of the contacts 11d is not limited as such. For example, the key 11 may be constructed in such a way that when the depressing portion 11a is depressed, the contacts 11d enter the off-state, and when the depressing portion 11a is returned to its original position (the initial state), the contacts 11d enter the on-state.

In this case, the key 11 would detect the input based on physical contact by the live body (the operation in which the user depresses the depressing portion 11a with a finger, for example) as the off-state of the contacts 11d.

The proximity sensor 12 is disposed between a plate portion 11e of the depressing portion 11a and the spring 11c. When the live body (a finger of the user, for example) touches the depressing portion 11a or comes in sufficient proximity to the proximity sensor 12, the touch or the nearing of the finger is detected by the proximity sensor 12 as an input based on the proximity of the live body (or the live body in proximity to the sensor 12 is detected), a detection signal corresponding thereto (hereinafter referred to as proximity information) is generated and is provided to the information processing apparatus.

As long as the proximity sensor 12 can detect a live body in proximity, and can be disposed near the key 11 (the depressing portion 11a), its construction need not be limited in any way. In this example, it is assumed that it has a construction such as that shown in FIG. 2 (a construction disclosed by the present applicant in Japanese Patent Application No. 2001-151499, the entire disclosure of which application is incorporated herein by reference).

FIG. 2 is a block diagram showing an example of a construction of the proximity sensor 12.

The proximity sensor 12 comprises line-shaped transmission electrodes 22-1 to 22-3, an oscillator 21 for providing each electrode with an alternating current of a predetermined frequency for transmission (100 kHz, for example), line-shaped reception electrodes 23-1 to 23-4 for receiving alternating currents from the transmission electrodes 22-1 to 22-3 by way of electrostatic effects, a receiver 24 for receiving alternating currents flowing through the reception electrodes 23-1 to 23-4, and a processor 25 to which outputs from the oscillator 21, the reception electrodes 23-1 to 23-4, and the receiver 24 are input.

Further, the proximity sensor 12 may also comprise, where appropriate, switches 26-1 to 26-3 respectively between the oscillator 21 and the transmission electrodes 22-1 to 22-3. Switches 27-1 to 27-4 may also be provided respectively between the receiver 24 and the reception electrodes 23-1 to 23-4. The switches 26-1 to 26-3 and the switches 27-1 to 27-4 enter the on-state at a predetermined timing (for example, when the oscillator 21 outputs an alternating current).

The receiver 24 comprises an AM demodulator, which includes a band-pass filter (BPF) 24a for passing only an alternating current of a predetermined frequency band, an amplifier 24b, and a detector 24c, as well as an A/D converter 24d which performs analog-to-digital conversion (A/D conversion) of a detected output from the AM demodulator.

The reception electrodes 23-1 to 23-4 are disposed so as to be substantially perpendicular to the transmission electrodes 22-1 to 22-3, and although there are cross points, these electrodes are not in contact with each other.

Figure 3:
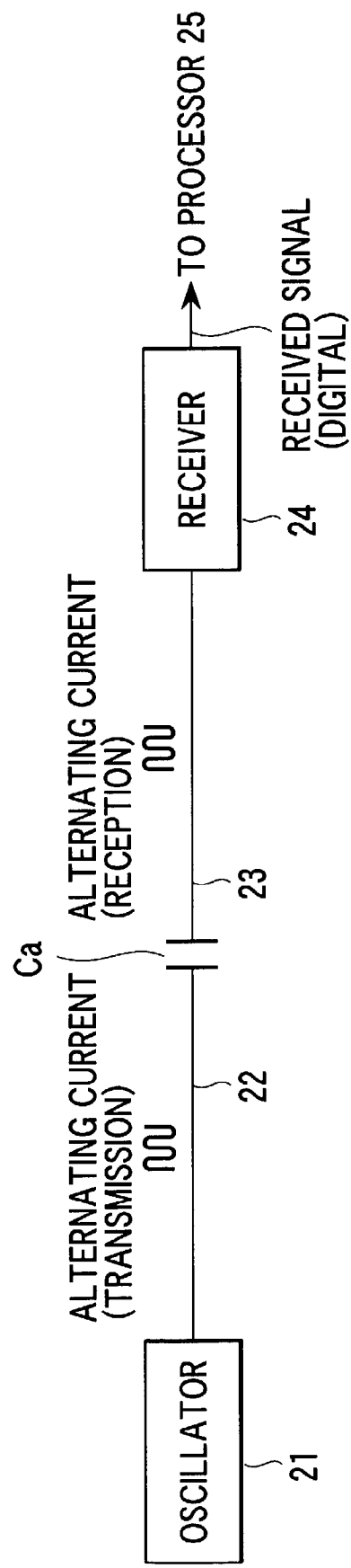
FIG. 3 is a block diagram showing an example of an equivalent circuit at a cross point between a transmission electrode and a reception electrode of the proximity sensor of FIG. 2.

In other words, as shown in FIG. 3, a circuit equivalent to a capacitor Ca for storing charges is, in effect, formed at a cross point between a transmission electrode 22 and a reception electrode 23.

Thus, when an alternating current oscillated and output by the oscillator 21 is provided to the transmission electrode 22, an alternating current flows through the opposing reception electrode 23 via the cross point (the capacitor Ca) by means of electrostatic induction.

In other words, when the oscillator 21 applies an alternating voltage to the transmission electrode 22, an alternating current is generated in the reception electrode 23 due to capacitive coupling by the electrostatic capacitance of the capacitor Ca between the transmission electrode 22 and the reception electrode 23, and is provided to the receiver 24.

The receiver 24 provides to the processor 25 the amount of the received alternating current (the alternating current input via the capacitor Ca) as digital data (a reception signal), however, the amount of the alternating current input to the receiver 24 via the capacitor Ca is dependent solely upon the electrostatic capacitance of the capacitor Ca. In addition, the electrostatic capacitance of the capacitor Ca is static and maintains a fixed value unless the transmission electrode 22 or the reception electrode 23 changes in shape, for example. Thus, as long as the same alternating current is applied to the transmission electrode 22, the amount of the alternating current input to the receiver 24 via the capacitor Ca is constant in value.

Figure 4:
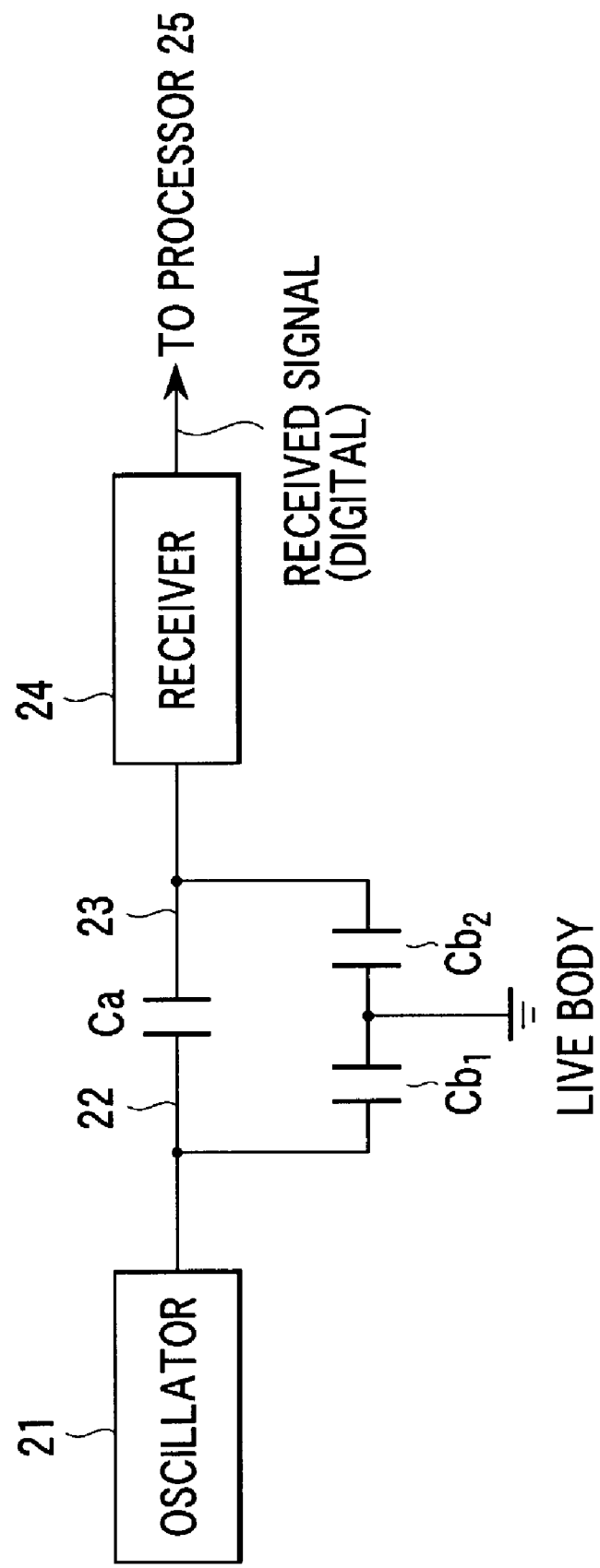
FIG. 4 is a diagram showing an example of an equivalent circuit at the cross point between the transmission electrode and the reception electrode of the proximity sensor of FIG. 2 when a live body is in proximity to the cross point.

However, when the live body (such as the user's finger) comes in proximity to the cross point between the transmission electrode 22 and the reception electrode 23, the equivalent circuit at the cross point comes to approximate that illustrated in FIG. 4.

In other words, since the live body will be considered a virtual grounding point (earthing), the equivalent circuit assumes a configuration in which a series circuit of a capacitor Cb1 formed between the live body and the transmission electrode 22 and a virtual capacitor Cb2 formed between the live body and the reception electrode 23 is connected in parallel to the above-mentioned capacitor Ca formed between the transmission electrode 22 and the reception electrode 23.

Thus, when an alternating voltage is applied to the transmission electrode 22, it is received by the reception electrode 23 via the capacitor Ca, and the amount of the alternating current provided to the receiver 24 is reduced by an amount corresponding to a current which flows to the earthing (the live body) via the capacitor Cb1.

As mentioned above, the electrostatic capacitance of the capacitor Ca is static and maintains a fixed value unless the transmission electrode 22 or the reception electrode 23 changes in shape, for example, but the electrostatic capacitances of the capacitors Cb1 and Cb2 become smaller as the live body approaches the transmission electrode 22 and the reception electrode 23.

Taking advantage of such a phenomenon, the processor 25 uses a reception signal, which has been AM demodulated by the AM demodulator (the BPF 24a, the amplifier 24b, and the detector 24c) of the receiver 24, and has then been converted to a digital signal by the A/D converter 24d, in order to determine whether or not the live body is nearing the cross point between the electrodes or to measure how close in proximity the live body is (the distance between the live body and the cross point).

Thus, as shown in FIG. 2, if a plurality of keys 11-1 to 11-12 arranged in a matrix are respectively positioned on the cross points, when a key 11-i ("i" is an arbitrary value between 1 through 12) is touched by the user's finger, the processor 25 determines (detects) that the live body is nearing the key 11-i (or the cross point located under that key), and provides proximity information (detection signal) which indicates this event to the information processing apparatus.

In the example shown in FIG. 2, since the keys 11-1 to 11-12 are arranged in a matrix of four rows and three columns, four reception electrodes 23-1 to 23-4 and three transmission electrodes 22-1 to 22-3 are provided. However, the number of the transmission electrodes 22 and the reception electrodes 23 are not limited, although it is preferable, as described hereinafter, that the transmission electrodes 22 and the reception electrodes 23 be arranged in such a way that one cross point is disposed under each key.

In the example shown in FIG. 2, although the angle between the transmission electrode 22 and the reception electrode 23 at each cross point is about 90 degrees, the angle is not limited thereto. In other words, as long as the transmission electrode 22 and the reception electrode 23 are not in contact with each other and are arranged so as to form a cross point, the arrangement need not be limited to the one described herein.

Figure 5:
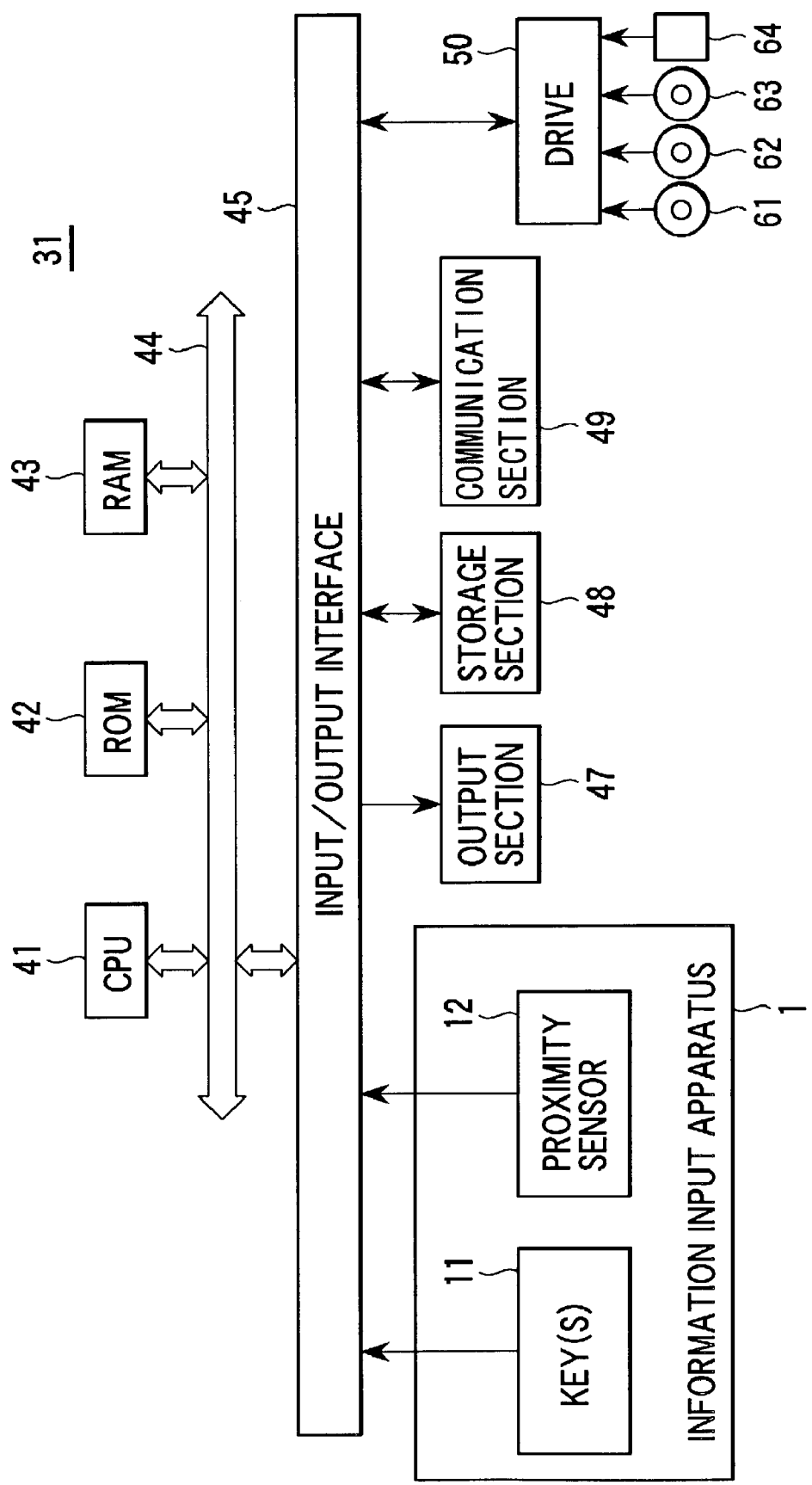
FIG. 5 is a block diagram showing an example of a construction of the information processing apparatus to which the present invention is applied.

Next, an example of the operation of an information processing apparatus to which the information input apparatus 1 is applied will be briefly explained. A detailed description of the operation will be given in an example of the operation of an information processing apparatus 31 as shown in FIG. 5 hereinafter.

As mentioned above, the information input apparatus 1 is provided with the key 11, which detects the input based on physical contact by the live body as the on-state (or the off-state) of the contacts 11d, and the proximity sensor 12, which detects the input based on the proximity or the nearing of the live body (such as the user's finger) to the key 11.

Thus, using the information processing apparatus to which the information input apparatus 1 is applied, the user is able to utilize a technique referred to as "tool tipping," which is used as an interface for a mouse, with a physical key (as hardware).

In other words, "tool tipping" is a technique in which the following operations (a) to (c) are possible, and by utilizing tool tipping, the user may obtain information regarding functions assigned to buttons and icons on a screen before making the information processing apparatus execute these functions.

(a) When the user operates a mouse to locate a cursor of the mouse on a button or an icon on a screen, the information processing apparatus displays a pop-up tool tip in which information regarding the function, such as the name of the function, assigned to the button or the icon on the screen is displayed.

(b) When the user pushes a button on the mouse (when the user left-clicks), the information processing apparatus executes the function assigned to the button or the icon on the screen.

(c) If the user does not push the button of the mouse (if the user does not left-click) and operates the mouse to move the mouse cursor to another location, the information processing apparatus does not execute the function assigned to the button or the icon on the screen.

The information processing apparatus to which the information input apparatus 1 is applied is capable of performing, for example, the following operations (A) to (C) corresponding to the operations (a) through (c) above.

(A) When the user puts a finger on the depressing portion 11a of the key 11 (contacting the depressing portion), the proximity sensor 12 detects the contact and inputs proximity information to the information processing apparatus. According to the proximity information which is input, the information processing apparatus displays a pop-up tool tip in which information relating to a function (such as the name of the function) assigned to the key 11 is displayed.

(B) When the user pushes the depressing portion 11a with a finger (when the key 11 is operated), the information processing apparatus executes the function assigned to the key 11.

(C) If the user does not depress the depressing portion 11a (does not operate the key 11) and releases the finger from the depressing portion 11a (moving it to another location), the information processing apparatus does not execute the function assigned to the key 11.

<Information Processing Apparatus>

FIG. 5 is a block diagram showing an example of a construction of the information processing apparatus 31 to which the present invention is applied.

A CPU (Central Processing Unit) 41 executes various processes according to a program stored in a ROM (Read Only Memory) 42 or a program which is loaded to a RAM (Random Access Memory) 43 from a storage section 48.

Data which are needed in order for the CPU 41 to execute various processes are stored, as deemed appropriate, in the RAM 43.

The CPU 41, the ROM 42, and the RAM 43 are connected to each other via a bus 44. An input/output interface 45 is also connected to the bus 44.

As an input section, the information input apparatus 1 of FIG. 1 described above is connected to the input/output interface 45. In other words, the key 11 and the proximity sensor 12 disposed near the key 11 are connected to the input/output interface 45.

In addition, an output section 47 comprising a display or the like, the storage section 48 comprising a hard disk or the like, and a communication section 49 comprising a modem, a terminal adapter, etc are connected to the input/output interface 45. The communication section 49 performs communication processes such as communications via a network or wireless communications. Also, where appropriate, the storage section 48 may be omitted.

Further, a drive 50 is connected to the input/output interface 45 if needed. Where appropriate, a magnetic disk 61, an optical disk 62, a magneto-optical disk 63, a semiconductor memory 64 or the like may be mounted to the drive 50, and a computer program read out therefrom is installed in the storage section 48 as required.

Although not shown, if necessary, blocks for executing a variety of functions (such as telephone communication functions of a cellular phone 81 of FIG. 10, which will be described hereinafter), other than those blocks described above, may be provided in the information processing apparatus 31.

Figure 6:
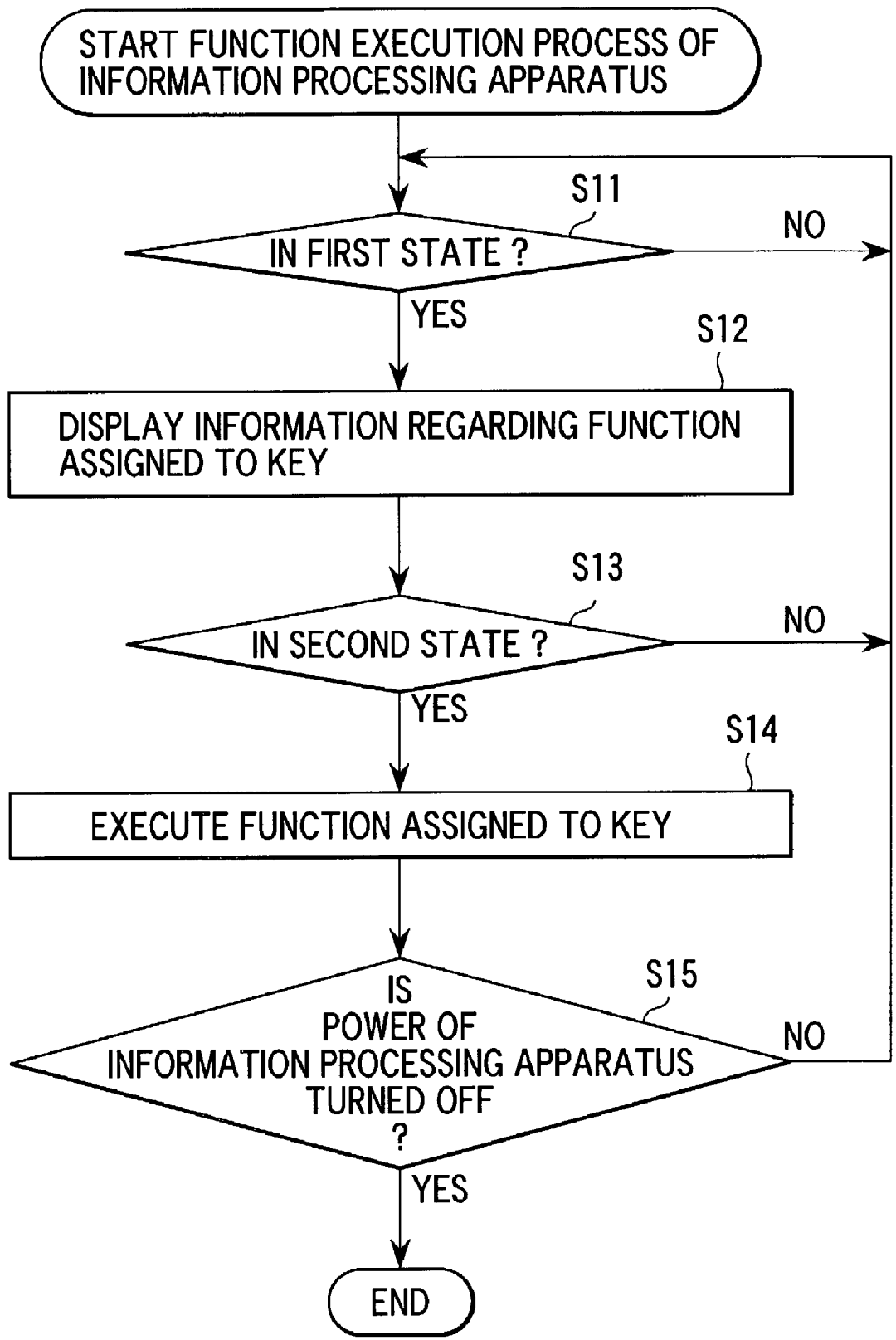
FIG. 6 is a flow chart for explaining a function executing process of the information processing apparatus of FIG. 5.

Now, an example of a process for executing the functions of the information processing apparatus 31 will be described with reference to the flow chart of FIG. 6.

It is assumed that a power source of the information processing apparatus 31 is turned on (the CPU 41 and the like are turned on) and a predetermined initial screen is displayed on a display (the output section 47).

Figure 8:
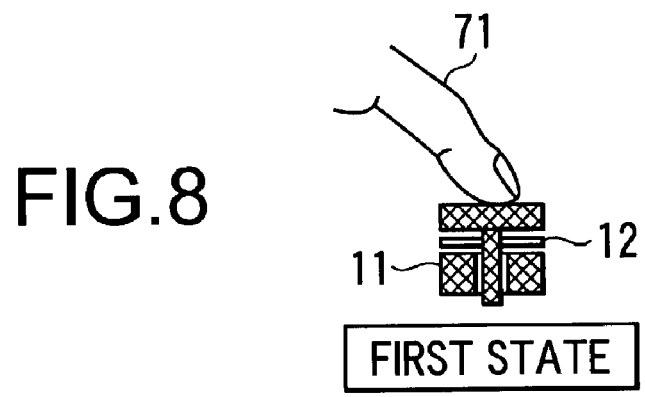
FIG. 8 is a diagram showing a first state, as in step S11 of FIG. 6, of the key of the information processing apparatus of FIG. 5.

In step S11, the CPU 41 determines whether or not a live body, such as that shown in FIG. 8 (a finger 71), is in a first state, where it is in contact with (or in proximity to) the key 11.

Assuming that the user is not touching the key 11 with the finger 71 (it is not close enough to the proximity sensor 12), because the proximity sensor 12 does not detect the live body (does not output proximity information), the CPU 41 therefore determines (identifies) in step S11 that the first state is not entered, returns to step S11, and determines again whether or not the first state is entered. In other words, the CPU 41 constantly monitors whether or not the live body is in contact with the key 11 and repeats the process until the live body contacts the key 11 (until the proximity sensor 12 detects the live body).

Subsequently, as shown in FIG. 8, when the user places the finger 71 on the key 11 (when it approaches the proximity sensor 12 enough), the proximity sensor 12 detects the live body (the finger 71) and inputs proximity information (a detection signal) to the input/output interface 45.

Then, in step S11, the CPU 41 obtains the proximity information via the bus 44, and thereby determines (identifies) that the first state is entered. In step S12, the CPU 41 causes information relating to the function assigned to the key 11 to be displayed on the display (the output section 47) via the bus 44 and the input/output interface 45.

Figure 9:
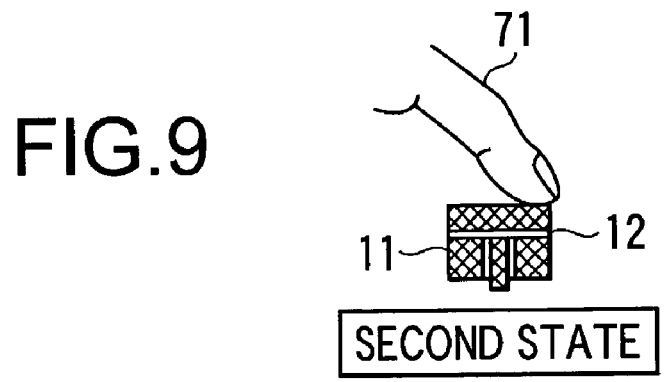
FIG. 9 is a diagram showing a second state, as in step S13, of the key of the information processing apparatus of FIG. 5.

In step S13, the CPU 41 determines whether a second state, where the live body (the finger 71) has operated (depressed) the key 11 as shown in FIG. 9, is entered. If it is determined that the second state is not entered, the process returns to step S11 and subsequent steps are repeated.

Figure 7:
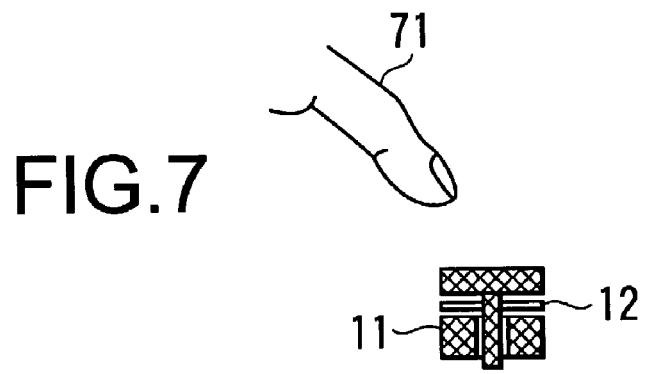
FIG. 7 is a diagram showing an initial state of a key of the information processing apparatus of FIG. 5.

For example, when the user releases his finger 71 from the key 11 (returning to the state illustrated in FIG. 7), the CPU 41 clears the display of the information relating to the function assigned to the key 11 and continues with the process until the finger 71 is placed on the key 11 again (until the user places the key 11 in the first state as illustrated in FIG. 8).

In addition, as long as the first state illustrated in FIG. 8 is maintained, the CPU 41 repeats steps S11 to S13. In other words, the CPU 41 keeps displaying the information relating to the function assigned to the key 11 on the display.

Assuming that the user depresses the key 11 with the user's finger 71 as shown in FIG. 9, the key 11 inputs a signal corresponding to the depression operation (information indicating that the contacts 11d are in the on-state) to the input/output interface 45.

Then, the CPU 41 obtains the signal (the information indicating that the contacts 11d are in the on-state) via the bus 44 in step S13 to thereby determine (identify) that the second state is entered, and executes the function assigned to the key 11 in step S14.

In step S15, the CPU 41 determines whether or not the power source of the information processing apparatus is turned off. If it is determined that the power is turned off, the CPU 41 terminates the process. On the other hand, if it is determined that it is not turned off, the process returns to step S11 and the subsequent steps are repeated.

As such, by using the information processing apparatus 31, the user is able to utilize a technique comparable to "tool tipping" described above without using a mouse.

Now, specific embodiments of the information processing apparatus 31 will be described with reference to the drawings.

<First Embodiment>

Figure 10:
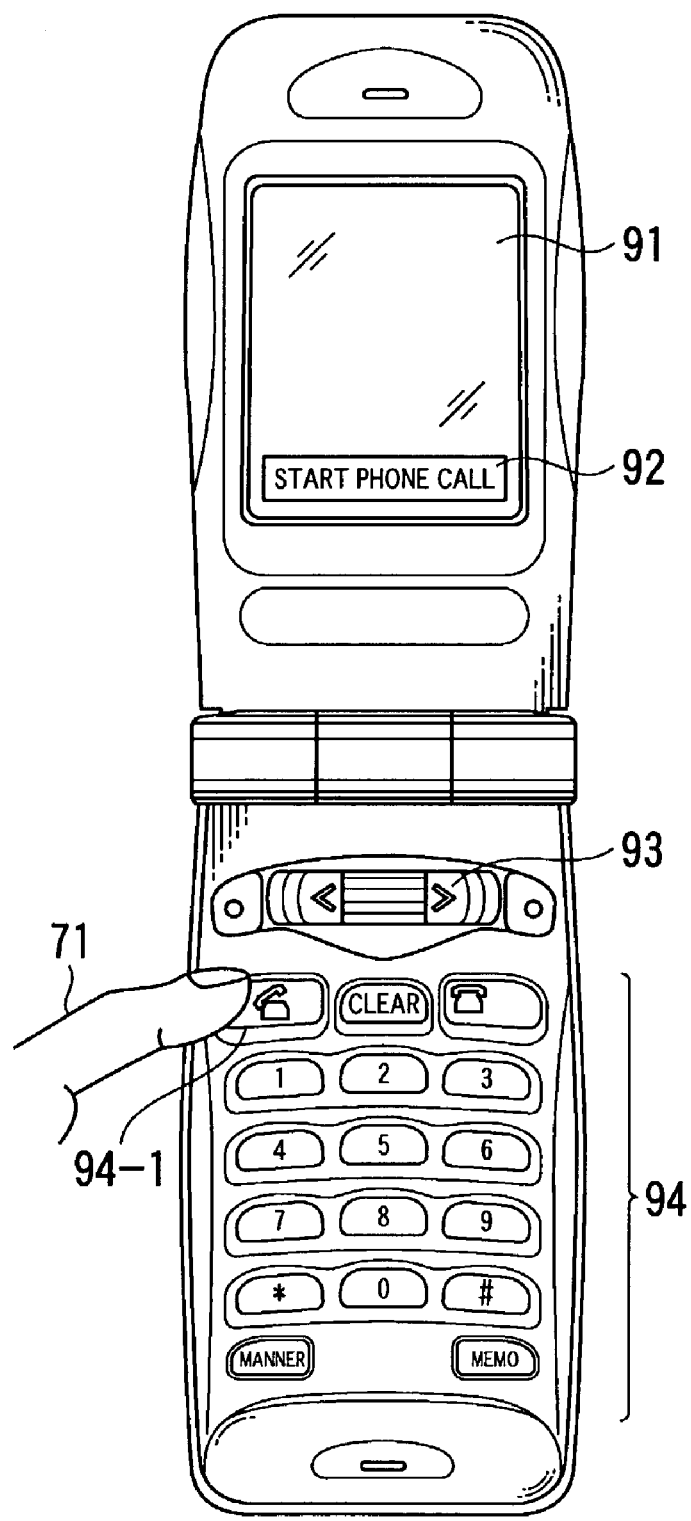
FIG. 10 is a view showing an example of an external construction of a cellular phone as a first embodiment of the information processing apparatus of FIG. 5.

FIG. 10 shows an example of an external construction of the cellular phone 81 as a first embodiment of the information processing apparatus 31.

There is provided on the upper portion of the face of the cellular phone 81 a display portion 91 comprising a liquid crystal display or the like. A jog dial 93, which is freely depressible and rotatable, is provided in approximately the center of the cellular phone 81 so as to protrude slightly from the surface. And keys 94 are provided in the lower portion of the face of the cellular phone 81.

The keys 94 comprise numeric keys "0" to "9" for inputting a phone number, for example, and operational keys to which various functions are assigned. Various instructions may be input by using the keys 94. A plurality of functions may also be assigned to the numeric keys, as required.

Although not shown, there are provided, under (near) the keys 94, the proximity sensors 12 for detecting the nearing of the live body to each of the keys 94.

In other words, the keys 94 correspond to the keys 11-1 to 11-12 of FIG. 2 (the key 11 of FIG. 5). As shown in FIG. 2, a cross point between the transmission electrode 22 and the reception electrode 23 is disposed under each of the keys 94.

However, as mentioned above, 12 keys (keys 11-1 to 11-12) are arranged in a matrix of four rows and three columns in the example of FIG. 2, while seventeen keys (keys 94) are arranged in a matrix of six rows and three columns in the example of the cellular phone 81 in FIG. 10. Therefore, the number of the transmission electrodes 22 of the cellular phone 81 should preferably be three as in FIG. 2, and the number of the reception electrodes 23 should preferably be six.

The display portion 91 corresponds to the output section 47 of FIG. 4. When the user's finger 71 is placed on one of the keys 94 (when the cellular phone 81 identifies that the first state is entered), a tool tip 92, in which information relating to the function assigned to the key is indicated, is displayed as a pop up in a predetermined area within the display section 91 (the lower part of the display section 91 in the example of FIG. 10).

For example, as shown in FIG. 10, assuming that the finger 71 is placed on a key 94-1, the tool tip 92, in which the name of the function of the key 94-1 "START PHONE CALL" is indicated, is displayed as a pop-up on the display section 91.

Thus, by using the cellular phone 81, the user may find a desired function, even if it is not known which key the desired function is assigned to, by repeating the simple operation of moving the finger 71 to an arbitrary location over the keys 94 and looking at the displayed tool tip 92.

In other words, when the tool tip 92 indicating the name of the desired function is displayed as a pop-up (when the cellular phone 81 identifies that the first state is entered), the user stops moving the finger 71, and by depressing the key (one of the keys 94) on which the finger 71 is placed (by having the cellular phone 81 identify that the second state is entered), the cellular phone 81 can be made to execute the desired function.

Other constructions and operations of the cellular phone 81 may easily be understood by those skilled in the art and do not directly relate to the present invention, therefore description thereof will be omitted.

<Second Embodiment>

As to the key 11 of the information processing apparatus 31 of FIG. 5, its shape is not limited as long as it allows for the inputting of predetermined information and the proximity sensor 12 can be located near the key 11.

Figure 11:
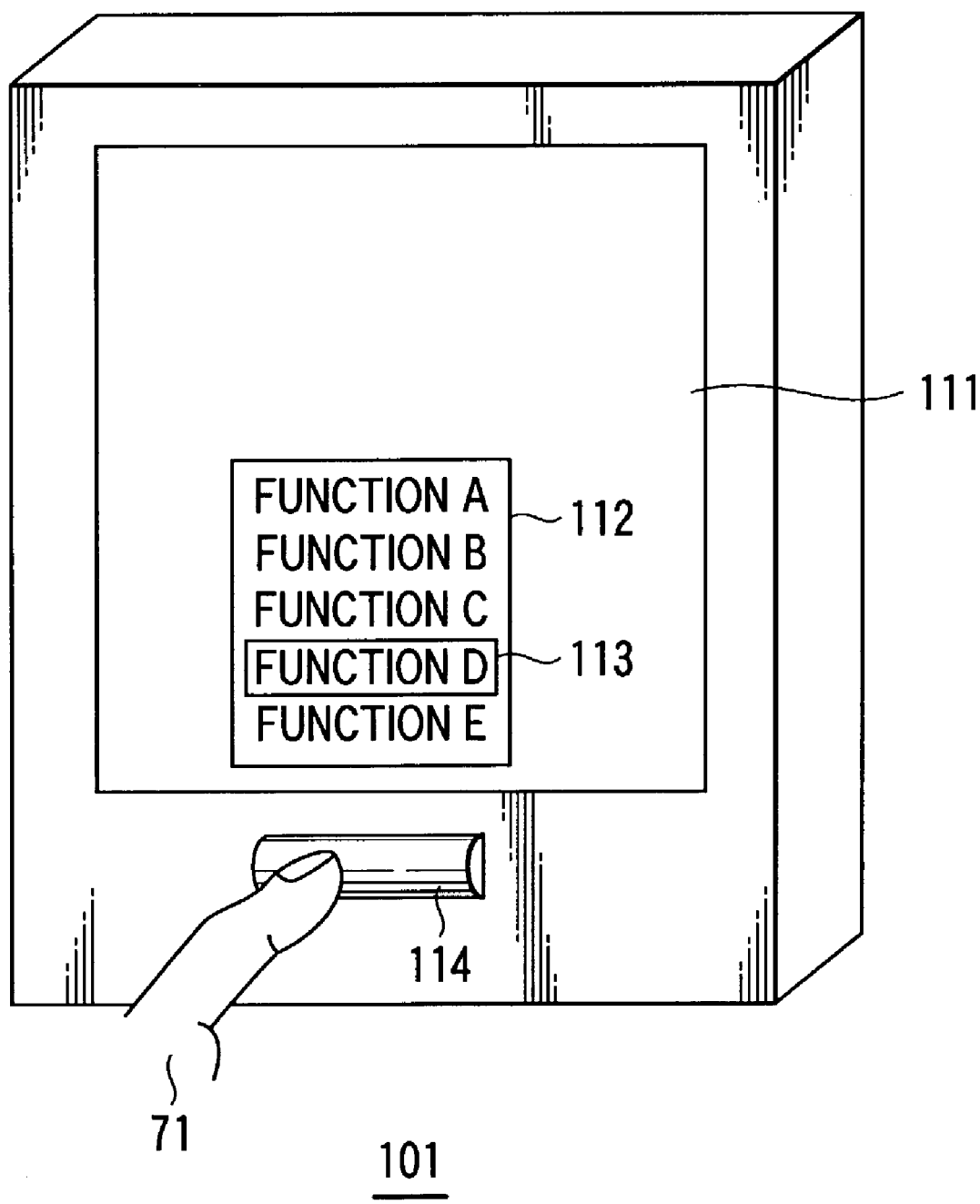
FIG. 11 is a view showing an example of an external construction of a PDA (Personal Digital Assistant) as a second embodiment of the information processing apparatus of FIG. 5.

For example, not only keys similar to the keys 94 of the cellular phone 81 mentioned above, but also the jog dial 93 of the cellular phone 81, a jog dial 114 of a PDA (Personal Digital Assistant) 101 as shown in FIG. 11 and the like may be used.

FIG. 11 shows an example of a construction of a PDA as a second embodiment of the information processing apparatus 31.

A display section 111 comprising a liquid crystal display or the like is provided in the upper to middle portion of the face of the PDA 101. The jog dial 114 which is freely depressible and rotatable is provided in the lower portion of the face of the PDA 101 so as to project slightly from the surface.

Although not shown, the proximity sensor 12 which detects the nearing of the live body to the jog dial 114 is disposed under (near) the jog dial 114.

In other words, the jog dial 114 corresponds to one of the keys 11-1 to 11-12 of FIG. 2 (the key 11 of FIG. 5), and as shown in FIG. 2, one cross point between the transmission electrode 22 and the reception electrode 23 is located under the jog dial 114. Therefore, it is preferable that one each of the transmission electrode 22 and the reception electrode 23 be provided in the PDA 101.

The display section 111 corresponds to the output section 47 of FIG. 5. When the user's finger 71 is placed on the jog dial 114 (when the PDA 101 identifies the first state), a tool tip 112 in which information relating to the functions assigned to the jog dial 114 is displayed as a pop-up in a predetermined area within the display section 111 (at the lower portion of the display section 111 in the example illustrated in FIG. 11).

For example, as shown in FIG. 11, if the finger 71 is placed on the jog dial 114, the tool tip 112 is displayed on the display portion 111 as a pop-up. The tool tip 112 displays the names ("FUNCTION A" through "FUNCTION E") of a plurality of functions, which may be selected with the jog dial 114, as well as an anchor 113 located where the name of one of the plurality of functions is (in the example of FIG. 11, the anchor 113 is on "FUNCTION D").

As the user rotates the jog dial 114 with the finger 71, the anchor 113 is moved to (displayed) where one of the names of the functions "FUNCTION A" through "FUNCTION E" is displayed in accordance with the rotating operation.

Thus, when the anchor 113 is at a location where the name of the desired function is displayed, if the user depresses the jog dial 114 (if the PDA 101 identifies the second state), the PDA 101 may be made to execute the desired function.

For example, as shown in FIG. 11, if the anchor 113 is at the location where "FUNCTION D" is displayed and the user depresses the jog dial 114 with the finger 71 under such a condition, the PDA 101 can execute the "FUNCTION D."

Other constructions and operations of the PDA 101 may easily be understood by those skilled in the art and do not directly relate to the present invention, therefore description thereof will herein be omitted.

<Third Embodiment>

FIG. 12 shows an example of an external configuration of a remote controller 121 as a third embodiment of the information processing apparatus 31.

Functions of the remote controller 121 are not limited in particular, but in the present embodiment, it is assumed, for purposes of illustration only, that the remote controller 121 is used for selecting TV (television) channels displayed on a display section 133 of a TV receiver 122.

A plurality of keys 131, to each of which a function for selecting a predetermined channel is assigned, are provided on substantially the entire surface of the front face of the remote controller 121. For example, it is assumed that a function for selecting channel 1 (CH1) is assigned to a key 131-1.

In addition, although not shown, there is provided under each of the keys 131 the proximity sensor 12 for detecting whether or not the live body is in proximity to each of the keys 131.

In other words, the keys 131 correspond to the keys 11-1 to 11-12 of FIG. 2 (the key 11 of FIG. 5), and as shown in FIG. 2, one cross point between the transmission electrode 22 and the reception electrode 23 is provided under each of the keys 131.

However, as mentioned above, 12 keys (keys 11-1 to 11-12) are arranged in a matrix of four rows and three columns in the example of FIG. 2, while sixteen keys (keys 131) are arranged in a matrix of four rows and four columns in the example of the remote controller 121 of FIG. 12. Thus, it is preferable that four of the transmission electrodes 22 and four of the reception electrodes 23 be provided in the remote controller.

A communication section 132 is provided on a surface (top surface) adjacent and perpendicular to the upper portion of the front face of the remote controller 121. The communication section 132 corresponds to the communication section 49 of FIG. 5 and transmits various signals such as channel selecting signals to the TV receiver 122 by means of a wireless line (such as radio waves, infra-red rays, etc.)

For example, as shown in FIG. 12, if the user places the finger 71 on the key 131-1, the remote controller 121 identifies that the key 131-1 is in the first state, generates a signal representing this event (hereinafter referred to as a first state signal) and transmits it to the TV receiver 122.

The TV receiver 122 receives the first state signal and displays, as a pop-up, a tool tip 134-1, in which an image corresponding to the keys 131 of the remote controller 121 is displayed, in a predetermined area within the display section 133 (in the example shown in FIG. 12, the left side of the display section 133), while also displaying, as a pop-up, a tool tip 134-2, in which characters "CH1" and a program of the CH1 assigned to the key 131-1 on which the finger 71 is placed, in a predetermined area (in the example shown in FIG. 12, the upper right portion of the display section 133) different from the area in which the tool tip 134-1 is displayed.

Although not shown, at this point, a program of a channel previously selected is displayed on the whole display section 133 (except for the areas where the tool tip 134-1 and the tool tip 134-2 are displayed).

Under these conditions, when the user depresses the key 131-1 with the finger 71, the remote controller 121 identifies that the key 131-1 is in the second state and transmits a signal representing this event (a selection signal for CH1 assigned to the key 131-1).

Although not shown, at this point, the TV receiver 122 receives the selection signal for CH1, clears the tool tip 134-1 and the tool tip 134-2, and displays the program of CH1 on the whole display section 133.

However, in order to execute the series of steps mentioned above, not only should these functions be pre-installed in the remote controller 121, but corresponding functions must also be pre-installed in the TV receiver 122.

Thus, by using the remote controller 121, the user can display, on the display and in a small scale, the program (the tool tip 134-2) of the channel corresponding to the key on which the finger 71 is placed, while at the same time having the program of the previously selected channel displayed on the TV receiver 122.

Thus, it is not necessary for the user to visually identify on which part of the remote controller 121 the finger 71 is placed (there is no need to look at the keys 131), and the user may easily select a desired channel even when the user operates the remote controller 121 in a darkened room, for example.

Nowadays, since displays are often provided on remote controllers (the output section 47 of FIG. 5), in such cases, these remote controllers may display, as a pop-up, a tool tip on the display as in the cellular phone 81 mentioned above.

However, since the tool tip 134-1 and the tool tip 134-2 can be displayed as pop-ups directly on the TV receiver 122 as mentioned above, it is not essential for the remote controller 121 to have a display provided.

In this case, since the remote controller 121 need not be provided with a display, manufacturers can provide a compact remote controller 121 with a simple construction at a lower cost.

Other constructions and operations of the remote controller 121 and the TV receiver 122 may easily be understood by those skilled in the art and do not directly relate to the present invention, therefore description thereof will herein be omitted.

<Fourth Embodiment>

As mentioned above, the proximity sensor 12 of FIG. 2 is capable of measuring how close in proximity the live body is (the distance between the live body and a cross point).

Figure 13:
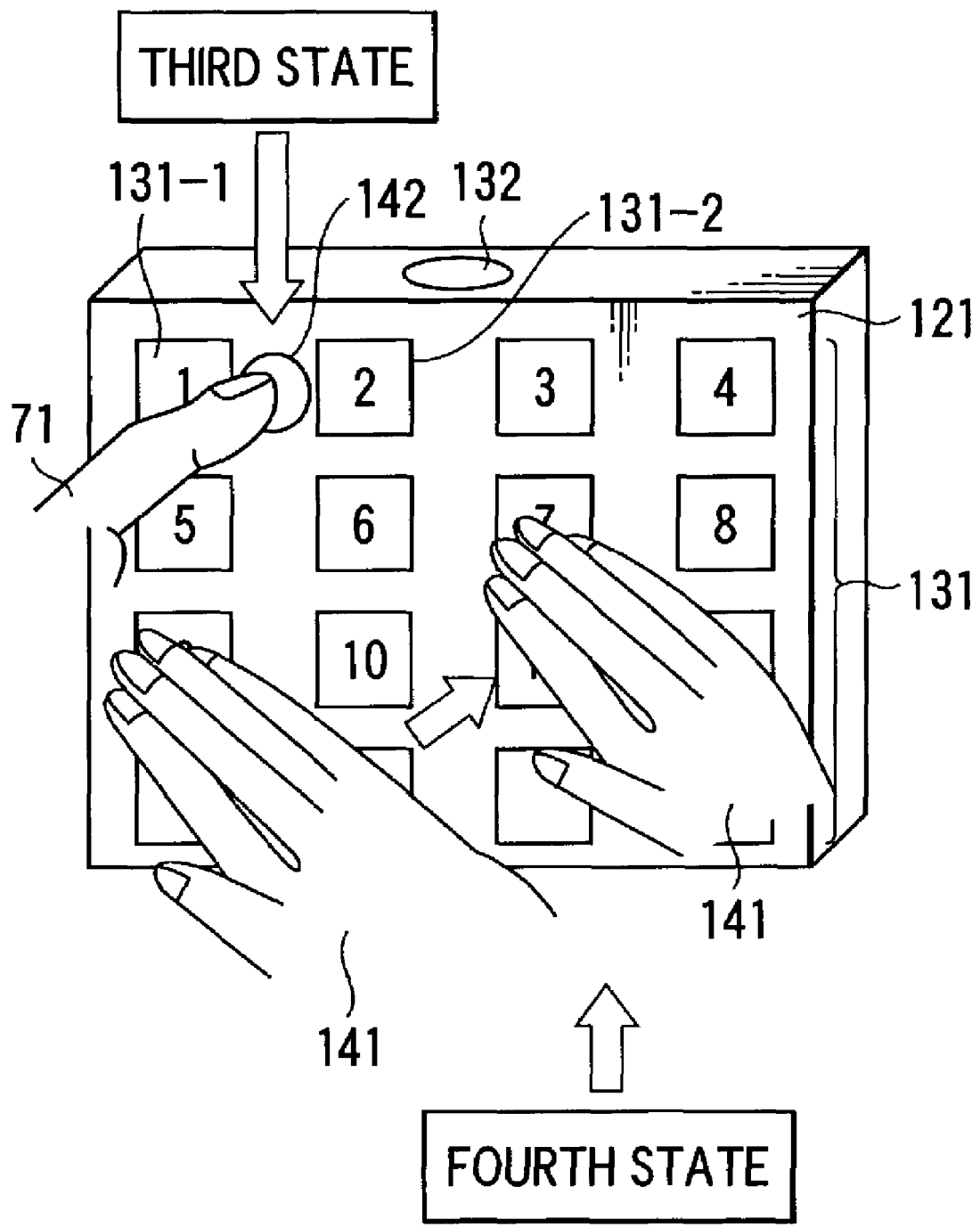
FIG. 13 is a view showing a third state and a fourth state, which a remote controller as a fourth embodiment of the information processing apparatus of FIG. 5 identifies.

Therefore, the remote controller 121 of FIG. 12, to which the proximity sensor 12 (the information input apparatus 1) is applied, is capable of identifying, for example, a third state as illustrated in FIG. 13, where the finger 71 is placed in an area 142 between the key 131-1 and a key 131-2, as well as a fourth state where a hand 141 is moved in a predetermined direction (in the upper right direction in the example shown in FIG. 13) over the keys 131.

In addition, the finger 71 may be disposed in any area, and not just the area 142, of two-dimensional detection areas of the proximity sensors 12 (where the transmission electrodes 22 and the reception electrode 23 cross), and the remote controller 121 will still be able to identify the third state where the finger 71 is disposed in these areas, and will also be able to identify the coordinates of the area where the finger 71 is disposed.

Further, the remote controller 121 may also detect a situation where the hand 141 is covering a plurality of cross points among the cross points between the transmission electrodes 22 and the reception electrodes 23.

Consequently, the remote controller 121 is capable of identifying the movement (coordinates) of the hand 141 in the fourth state. In other words, as long as the hand 141 (the live body) moves within the detection area, the remote controller 121 can identify the fourth state where the hand 141 has moved in a certain direction, regardless of the direction the hand 141 has moved in.

Therefore, by storing (registering) a variety of the third and fourth states, while at the same time assigning predetermined functions to these various registered states, the remote controller 121 is capable of executing a variety of functions corresponding not only to the first state mentioned above, where the finger is placed on the keys, and the second state mentioned above, where the keys are depressed, but also to the various third and fourth states.

Figure 14:
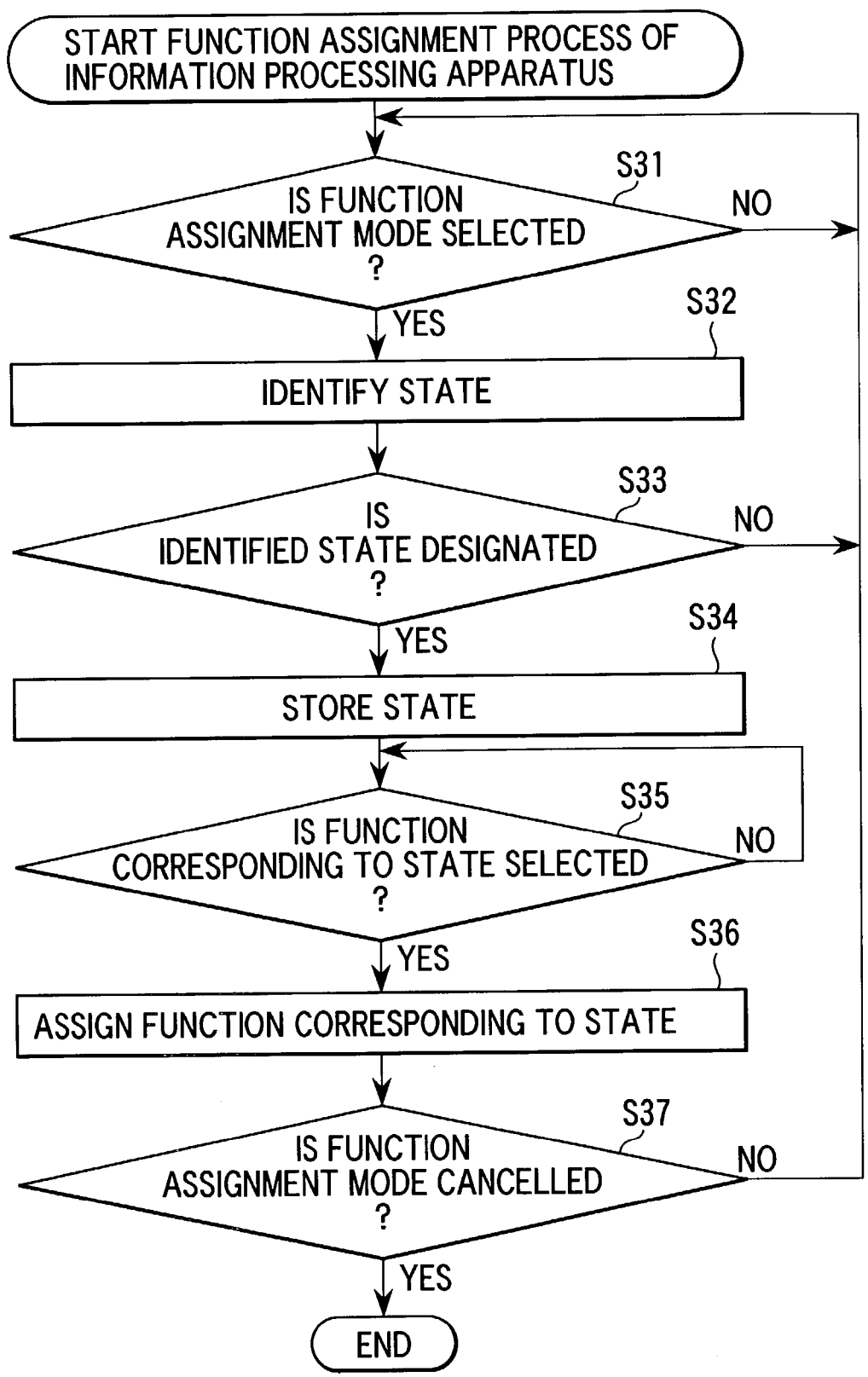
FIG. 14 is a flow chart for explaining a function assignment process of the information processing apparatus of FIG. 5.

A process for identifying and registering the additional states (the third or the fourth state) mentioned above and for assigning corresponding functions (hereinafter referred to as a function assignment process) is shown in FIG. 14 in detail.

Now, the function assignment process will be described with reference to FIG. 14.

This function assignment process may be executed by any information processing apparatus, and not only the remote controller 121, as long as it is an information processing apparatus to which the information input apparatus 1 of FIG. 1 is applied, or in other words, as long as it is the information processing apparatus 31 of FIG. 5. Therefore, FIG. 14 is a flow chart for explaining the function assignment process for the information processing apparatus 31 in general, not only for the remote controller 121.

Further, the information processing apparatus 31 may execute the function assignment process for the first state and the second state as required. For example, as will be described hereinafter, when a keyboard of a PC is made to function as a mouse, functions corresponding to a left-click or a right-click of the mouse may be assigned to a certain key of the keys of the keyboard (the function corresponding to a left-click or a right-click of the mouse may be assigned as a function corresponding to the second state of that certain key).

In step S31 the CPU 41 determines whether or not a function assignment mode is selected. When it determines that the function assignment mode is not selected, it puts the process on hold.

On the other hand, if the CPU 41 determines in step S31 that the function assignment mode has been selected, it identifies in step S32 a state effected by the user (such as the third or the fourth state in FIG. 13, for example) based on the proximity information of the proximity sensor 12, which is input via the input/output interface 45 and the bus 44.

In this example, it is assumed that the identified state is temporarily stored in a predetermined area of the RAM 43, for example.

In step S33, the CPU 41 determines whether or not the user has designated the state identified in step S32. When it determines that the identified state has not been designated, the process returns to step S31 and repeats the subsequent steps. In other words, the CPU 41 determines that the function will not be registered in association with the state identified in step S32, and puts the process on hold until the next state is effected by the user.

On the other hand, when the CPU 41 determines in step S33 that the identified state has been designated, in step S34, the state identified in step S32 is stored in an area (hereinafter referred to as a confirmed area) different from the predetermined area in which the identified state was stored in step S32.

The confirmed area may be provided in the RAM 43 or in the storage section 48.

In step S35, the CPU 41 determines whether or not the user has selected a function to correspond to the state stored in step S34. When it determines that the function to correspond to the state has not been selected, the process returns to step S35, and the CPU 41 again determines whether or not the function to correspond to the state has been selected. In other words, the CPU 41 puts the process on hold until a function to correspond to the state is selected.

On the other hand, when the CPU 41 determines in step S35 that the function that is to correspond to the state has been selected, it assigns the function to correspond to the state in step S36.

The method of assigning a function is not limited to any particular method, but in this example, it is assumed, for purposes of illustration only, that the CPU 41 stores the name of the function corresponding to the state (the function selected in step S35) in the confirmed area where the state was stored in step S34.

In addition, the determination processing method of step S35 is not limited to any particular method, but in the present example, for example, it is assumed for purposes of illustration that when an arbitrary function is manually selected from a plurality of preset functions by the user or that when the user defines a new function, the CPU 41 determines that a function to correspond to the state has been selected.

In step S37, the CPU 41 determines whether or not the function assignment mode is cancelled or terminated. When the CPU 41 determines that the function assignment mode is cancelled, the process is terminated. On the other hand, when it determines that the function assignment mode is not cancelled, the process returns to step S31 and repeats the subsequent steps.

Thus, thereafter (after the function assignment process is executed), when a live body such as the user effects the predetermined state (the third or the fourth state in FIG. 13, for example) stored in the confirmed area, the CPU 41 may identify the predetermined state, read the name of the function (which corresponds to the predetermined state) stored together with the predetermined state, and execute the function. In other words, the CPU 41 is capable of executing processes comparable to steps S13 and S14 of FIG. 6, and which correspond to the predetermined state.

At this point, the CPU 41 may display information relating to the predetermined state (such as the name of the corresponding function) on the display (the output section 47) via the bus 44 and the input/output interface 45 (if the information processing apparatus 31 is the remote controller 121, the information may be displayed on the TV receiver 122).

Thus, since the information processing apparatus 31 is capable of identifying the third state and the fourth state described above, a function (command) other than functions pre-assigned to the keys (which would be, for example, channel selecting functions assigned to each of the keys 131 in the case of the remote controller 121) may be assigned as a function corresponding to these states.

Thus, the user may make the information processing apparatus 31 execute various types of functions by performing more gestural operations corresponding to the respective functions.

For example, the remote controller 121 may assign a function for canceling a channel selection (displaying the previously selected channel) as a function corresponding to the fourth state in FIG. 13. In this case, when the user decides to cancel a channel selection just made, the user need only perform an operation with the hand 141 which looks like a gesture for taking back the selection just made, namely, an operation where the hand 141 moves over the keys 131 in the upper right direction (the fourth state).

<Fifth Embodiment>

As mentioned above, the information processing apparatus 31 of FIG. 4 is capable of determining the fourth state where the live body (such as the user's finger) moves over a plurality of keys in a predetermined direction and of assigning a function which is to correspond to the fourth state. Further, the information processing apparatus 31 may also assign a new function to a key that is different from a function pre-assigned to that key.

Figure 15:
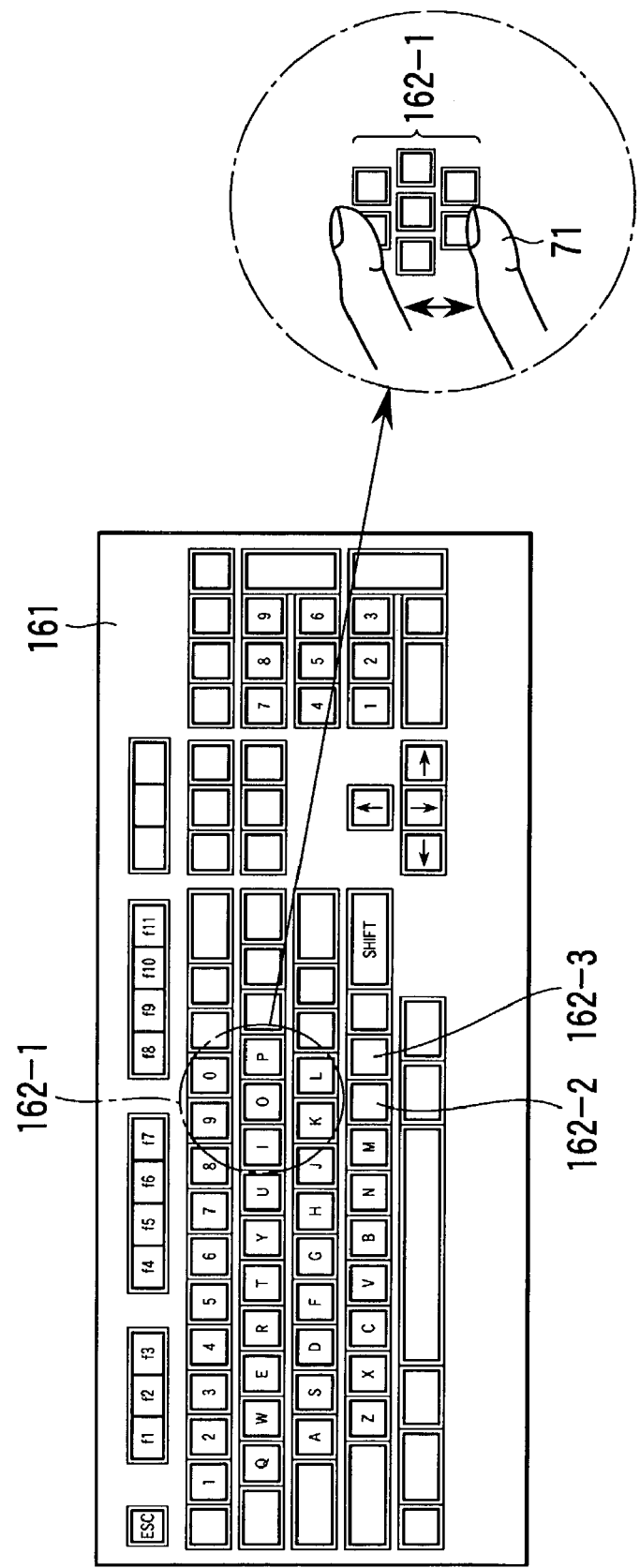
FIG. 15 is a view showing an example of an external construction of a keyboard of a personal computer as a fifth embodiment of the information processing apparatus of FIG. 5.

Therefore, in the case where the information processing apparatus 31 is a PC (personal computer) and its information input apparatus 1 is or is part of a keyboard 161 as shown in FIG. 15, the information processing apparatus 31 may make the keyboard 161 function as a mouse (a two-dimensional coordinates input device).

In other words, FIG. 15 illustrates an example of an external configuration of the keyboard 161 of a PC as a fifth embodiment of the information processing apparatus 31.

A plurality of keys are arranged on a surface of the keyboard 161 in accordance with some predetermined specification. Predetermined functions according to the predetermined specification are assigned to the plurality of keys. In other words, a variety of instructions may be input to the PC by using the plurality of keys of the keyboard 161.

Although not shown, the proximity sensor 12 for detecting whether a live body is in proximity to each key is disposed under (near) each of cursor moving keys 162-1, a left-click key 162-2, and a right-click key 162-3 of the plurality of keys.

In other words, the cursor moving keys 162-1, the left-click key 162-2, and the right-click key 162-3 correspond to the keys 11-1 to 11-12 of FIG. 2 (keys 11 of FIG. 5), and as shown in FIG. 2, one cross point between the transmission electrode 22 and the reception electrode 23 is provided under each of the cursor moving keys 162-1, the left-click key 162-2, and the right-click key 162-3.

However, in the example of FIG. 2, as mentioned above, 12 keys (keys 11-1 to 11-12) are arranged in a matrix of four rows and three columns, while in the example of the keyboard 161 of FIG. 15, nine keys (the left-click key 162-2, and the right-click key 162-3, and seven keys constituting the cursor moving keys 162-1) are arranged according to the predetermined specification. Thus, the number of the transmission electrodes 22 and the reception electrodes 23 of the keyboard 161 need to be such that one cross point can be provided under each of the cursor moving keys 162-1, the left-click key 162-2, and the right-click key 162-3.

In this particular example, it is assumed that when both of the user's hands are placed on the keyboard 161, a normal character input mode is selected, and when only the user's right hand is placed on the keyboard 161, a mouse mode (a two-dimensional coordinates input mode) is selected.

In this example, although not shown, a left-hand detecting sensor for detecting a live body is disposed near a position where the user's left hand is to be placed. When the left-hand detecting sensor detects the live body (such as the user's left hand), the CPU 41 determines that both of the user's hands are placed on the keyboard 161. On the other hand, when the left-hand detecting sensor detects no live body, it determines that only the user's right hand is placed on the keyboard 161. However, the method for determining whether both of the user's hand or only the user's right hand is placed on the keyboard 161 is not limited as such.

Though the construction of the left hand detecting sensor is not limited in any way, in this example, the left hand detecting sensor is constructed by, for example, disposing a cross point between the transmission electrode 22 and the reception electrode 23 (one that is different from the cross point under each of the cursor moving keys 162-1, the left-click key 162-2, and the right-click key 162-3) near a position where the user's left hand is to be placed.

Thus, it would not be necessary for the user to switch between the two modes (the normal character input mode and the mouse mode) by means of an explicit command.

Further, in this example, as functions for when the mouse mode is selected, a function corresponding to the left-click of the mouse is assigned to the left-click key 162-2, a function corresponding to the right-click of the mouse is assigned to the right-click key 162-3, and a function corresponding to the moving of the cursor of the mouse is assigned as a function corresponding to the fourth state over/on the cursor-moving keys 162-1.

Thus, when the CPU 41 determines that only the user's right hand is placed on the keyboard 161, the keyboard 161 can be made to function as a mouse.

More specifically, when the user's finger 71 moves over the cursor-moving keys 162-1, the CPU 41 identifies its movement path according to proximity information of the proximity sensor 12 (identifies that the fourth state is entered) and moves (displays) the mouse cursor displayed on the display (the output section 47) in accordance with the movement path of the finger 71. When the left-click key 162-2 is depressed with the finger 71, the CPU 41 identifies this event (identifies that the second state is entered) and executes the function corresponding to the left-click of the mouse. When the right-click key 162-3 is depressed with the finger 71, the CPU 41 identifies this event (identifies that the second state is entered) and executes the function corresponding to the right-click of the mouse.

The cursor moving keys 162-1, the left-click key 162-2, and the right-click key 162-3 are not limited to the keys shown in FIG. 15, and any key of the keyboard 161 may be used. Further, the number of the cursor-moving keys 162-1 is not limited either. However, it is necessary that one cross point between the transmission electrode 22 and the reception electrode 23 be provided under each of the selected cursor moving keys 162-1, the selected left-click key 162-2, and the selected right-click key 162-3.

Other constructions and operations of the PC and the keyboard 161 may easily be understood by those skilled in the art and do not directly relate to the present invention, therefore description thereof will herein be omitted.

As such the information input apparatus 1 of FIG. 1 may be applied to different information processing apparatuses 31, such as the cellular phone 81, the PDA 101, the remote controller 121, the PC having the keyboard 161, and the like, and by utilizing the information processing apparatus 31 exemplified by these embodiments, the user can utilize the "tool tip" technique without using a mouse.

In order to execute the sequence of steps mentioned above through software, a computer in which programs of such software are built into dedicated hardware may be used, or the programs may be installed via a network or a recording medium to a general-purpose personal computer in which various functions are made executable by installing programs.

As shown in FIG. 5, the recording medium may include not only packaged media such as the magnetic disk 61 (including a flexible disk), the optical disk 62 (including CD-ROMs (Compact Disk-Read Only Memory), DVDs (Digital Versatile Disk), the magneto-optical disk 63 (including MDs (Mini Disc™)), or the semiconductor memory 64 in which a program is stored and distributed so as to provide, separate from the apparatus body, a user with the programs, but also the ROM 42 in which programs are stored and a hard disk included in the storage section 48 which are provided to the user as components built into the apparatus body in advance.

In this specification, steps for describing a program to be stored in a recording medium may include not only steps which are executed chronologically in accordance with the described order, but also steps which are executed in parallel or individually.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. An information processing apparatus comprising:
   first input means for detecting an input based on physical contact by a live body;
   second input means for detecting an input based on the proximity of said live body to said first input means and comprising a plurality of line-shaped transmission electrodes;
   an oscillator for providing each of said plurality of transmission electrodes with an alternating current for transmission;
   a plurality of line-shaped reception electrodes disposed so as not to be in contact with said plurality of transmission electrodes; and
   a receiver for receiving the alternating currents flowing through said plurality of reception electrodes;
   wherein said transmission electrodes and said reception electrodes are disposed so as to cross each other; and
   state identifying means for identifying a first state, where said live body is in proximity to said first input means, when the input based on the proximity of said live body to said first input means is detected by said second input means, and identifying a second state, where said first input means is operated, when the input based on contact by said live body is detected by said first input means.

2. The information processing apparatus as claimed in claim 1, further comprising display control means for controlling in such a way that information relating to said first input means is displayed when said first state is identified by said state identifying means.

3. The information processing apparatus as claimed in claim 2, wherein said information relating to said first input means includes information relating to a function assigned to said first input means, said information processing apparatus further comprising a function executing means for executing said function assigned to said first input means when said second state is identified by said state identifying means.

4. The information processing apparatus as claimed in claim 1, wherein said first input means comprises a jog dial for detecting the input based on physical contact by said live body when a depressing or rotational operation is performed.

5. The information processing apparatus as claimed in claim 1, wherein said first input means comprises a key as hardware having contacts and which detects the input based on physical contact by said live body as an on-state or an off-state of said contacts.

6. The information processing apparatus as claimed in claim 5, wherein said key is disposed above said cross points between said transmission electrodes and said reception electrodes.

7. The information processing apparatus as claimed in claim 6, wherein a plurality of said key is provided, and based on a detection by said second input means, said state identifying means further determines a third state where said live body is disposed in an area between a first key of said keys and a second key of said keys.

8. The information processing apparatus as claimed in claim 7, further comprising function assigning means for assigning a function corresponding to said third state, and
function executing means for executing said function corresponding to said third state assigned by said function assigning means when said third state is identified by said state identifying means.

9. The information processing apparatus as claimed in claim 8, wherein based on a detection by said second input means, said state identifying means further identifies a fourth state where said live body moves over a plurality of said keys in a predetermined direction;
said function assigning means assigns a function corresponding to said fourth state; and
said function executing means executes said function corresponding to said fourth state assigned by said function assigning means when said fourth state is identified by said state identifying means.

10. The information processing apparatus as claimed in claim 9, wherein said function assigning means further assigns to said keys a new function different from said functions which are already assigned to said keys.

11. The information processing apparatus as claimed in claim 10, wherein said first input means comprises a keyboard;
said function assigning means assigns a function corresponding to a left-click of a mouse to a certain key of said keys of said keyboard, assigns a function corresponding to a right-click of said mouse to a certain different key of said keys of said keyboard, said certain different key being different from said key to which said function corresponding to said left-click of said mouse is assigned, and assigns a function corresponding to a moving of a cursor by said mouse as a function corresponding to said fourth state; and
said function executing means makes said keyboard function as said mouse if said function executing means determines that a predetermined condition is satisfied, and based on an identification result by said state identifying means, executes one of said function corresponding to said left-click, said function corresponding to said right-click, and said function corresponding to the moving of said cursor by said mouse, each assigned by said function assigning means.

* * * * *